US007949347B1

(12) United States Patent
Copeland

(10) Patent No.: US 7,949,347 B1
(45) Date of Patent: May 24, 2011

(54) USING LANDLINE TELEPHONE RF SNIFFERS TO PROVIDE Z-COORDINATE AND IN-BUILDING LOCATION OF MOBILE TELEPHONES

(75) Inventor: Jenny Deason Copeland, West Bloomfield, MI (US)

(73) Assignee: AT&T Mobility II LLC, Atlanta, GA (US)

( * ) Notice: Subject to any disclaimer, the term of this patent is extended or adjusted under 35 U.S.C. 154(b) by 675 days.

(21) Appl. No.: 11/420,298

(22) Filed: May 25, 2006

(51) Int. Cl.
*H04W 24/00* (2009.01)
(52) U.S. Cl. ............... 455/456.1; 455/404.2; 455/456.2; 455/456.3; 455/457
(58) Field of Classification Search ................. 455/456.1
See application file for complete search history.

(56) References Cited

U.S. PATENT DOCUMENTS

| | | | | |
|---|---|---|---|---|
| 7,310,523 B1 * | 12/2007 | Cook et al. | ................. | 455/426.1 |
| 7,363,028 B2 * | 4/2008 | de Clerq et al. | ............ | 455/414.1 |
| 2002/0127994 A1 * | 9/2002 | Stanners | ........................ | 455/404 |
| 2003/0222819 A1 * | 12/2003 | Karr et al. | ..................... | 342/457 |
| 2005/0070308 A1 * | 3/2005 | Caspi et al. | ................ | 455/456.3 |

* cited by examiner

*Primary Examiner* — Nick Corsaro
*Assistant Examiner* — Amanuel Lebassi
(74) *Attorney, Agent, or Firm* — Parks IP Law LLC; Mickki D. Murray, Esq.

(57) ABSTRACT

A cellular telephone or other wireless mobile user equipment (UE) can be located with greater than cell precision by monitoring for transmitted radio signals at landline telephone sites, such as offices in a building. At each site, a telephone instrument device not only performs functions characteristic of a conventional desktop or landline telephone instrument, but also detects radio signals emitted by any nearby UE. Any detected signals are transmitted from the landline telephone site to a central monitoring location. The central monitoring location receives some or all of the transmitted signal information as well as information identifying the landline telephone site at which radio signals emitted by a UE have been detected, such as a landline telephone number. The telephone number is then used to determine the location of the landline telephone site.

20 Claims, 5 Drawing Sheets

USING LANDLINE TELEPHONE RF SNIFFERS TO PROVIDE Z-COORDINATE AND IN-BUILDING LOCATION OF MOBILE TELEPHONES

BACKGROUND OF THE INVENTION

1. Field of the Invention

The present invention relates generally to wireless telecommunication networks and, more specifically, to locating a mobile telephone handset or other mobile user equipment with precision within a relatively small or indoor region.

2. Description of the Related Art

It is desirable for a wireless telecommunication network to be able to determine the location of a mobile telephone handset or other mobile user equipment (UE) with greater than cell precision. In other words, it is desirable to be able to determine not only in which cell the UE is located but also the location of the UE within the cell. For example, a major concern is providing an emergency calling service that is similar to or compatible with that which has long been provided through the ("landline") public switched telephone network (PSTN). A person having a landline phone need only dial a short, easily remembered number (e.g., "911" in the United States and certain other countries) for the PSTN to automatically connect the caller with an emergency operator at a public safety answering point (PSAP). The PSAP equipment also automatically determines the caller's location (typically by street address) using an Automatic Location Identification (ALI) database and displays the location on a computer screen for the operator, who can then dispatch emergency personnel to the caller's location. This system is known in the United States as "Enhanced 911" or "E911." Cellular networks are increasingly providing similar or compatible ALI means for determining the location of a UE in the event of an emergency call. In the United States, the federal government has mandated a system known as Wireless Enhanced 911 for this purpose.

In accordance with Wireless Enhanced 911 and similar requirements, a number of ALI methods have been developed for wireless telecommunication networks to determine the location of a UE with greater than cell precision. These include Assisted GPS (A-GPS), which uses the Global Positioning System of satellites, as well as triangulation methods such as Time Difference of Arrival (TDOA) and Angle of Arrival (AOA), which use comparisons between signals received from the UE at a plurality of cell site radio towers. The device that performs these methods is known by various names, depending upon the network technology, but in some GSM networks is referred to as a Serving Mobile Location Center (SMLC).

The above-described ALI methods suffer from a number of problems and deficiencies. For example, they do not work well within buildings, which are made of materials that reflect RF signals. Also, there is no adequate means for determining the altitude or height at which the UE is located, as triangulation methods are generally limited to latitude and longitude dimensions (x-axis and y-axis coordinates, respectively). Accordingly, it would be desirable to provide a method for determining the location of user equipment with sufficient accuracy to locate a caller in three dimensions, such as within a multi-story building or similar structure. It is to the provision of such a method and system that the present invention is directed.

SUMMARY OF THE INVENTION

The present invention relates to a system and method for locating wireless mobile user equipment (UE), such as a telephone handset (also referred to as a cellular telephone or cell phone), in a wireless telecommunication network with greater than cell precision. A number of landline telephone sites (e.g., offices in an office building) are monitored to detect radio signals emanating from a UE. The location of the UE is determined by determining the location of one or more landline telephone sites at which such signals are detected. The invention can be used as an alternative to or in conjunction with Automatic Location Identification (ALI) systems that have heretofore been used for locating a UE from which an emergency call has been placed. The invention can also be used to locate a target UE in response to a law enforcement agency surveillance authorization (e.g., a court ordered "wiretap").

In an exemplary embodiment of the invention, at each of a plurality of landline telephone sites there is special landline telephone equipment, such as the telephone instrument device described in further detail below, that not only performs functions characteristic of a conventional desktop or landline telephone instrument, but also detects radio frequency (RF) signals emitted by any nearby UE. Information in the detected RF signals is transmitted from the landline telephone site to a central monitoring location. The information can be transmitted directly or, alternatively, indirectly via a private branch exchange (PBX) system or other intermediary devices, such as a computer server and data network. For example, the PBX equipment in the building where the telephone instrument devices are located can receive information from the telephone instrument devices and transfer it to a server computer, which in turn transmits some or all of the information via a data network to the central monitoring location. The central monitoring location receives at least an indication that such a transmission has occurred, though in some embodiments of the invention it receives some or all of the information detected in the radio signals, such as the International Mobile Subscriber Identity (IMSI) or other information that uniquely identifies the UE, digits dialed on the UE, voice communications, or information derived from this information by intermediary devices. Thus, in some embodiments of the invention, the transmissions for which the central monitoring site monitors can originate at the landline telephone sites themselves, while in other embodiments they can originate at the PBX or server computer equipment. In still other embodiments they can originate at the Central Office (CO) of the public switched telephone network (PSTN) to which the PBX system is connected.

The central monitoring location also receives information identifying the landline telephone site at which radio signals emitted by a UE have been detected. In the exemplary embodiment of the invention, this identifying information is the telephone number associated with the landline telephone instrument site. The telephone number is then used to determine the location of the landline telephone site. A conventional ALI database of the type used in E911 systems, which relates telephone numbers to locations, can be used for this purpose.

Once the location of the landline telephone site has been determined, appropriate action can be taken with regard to the nearby UE that emitted the radio signals. For example, if the UE is making an emergency ("911") call, the location can be provided to a Public Safety Answering Point (PSAP) operator, who can then dispatch emergency personnel to the location. In another example, if the UE is the target of a wiretap order, the location can be provided to the law enforcement agency authorized to receive the information.

DETAILED DESCRIPTION

Figure 1:
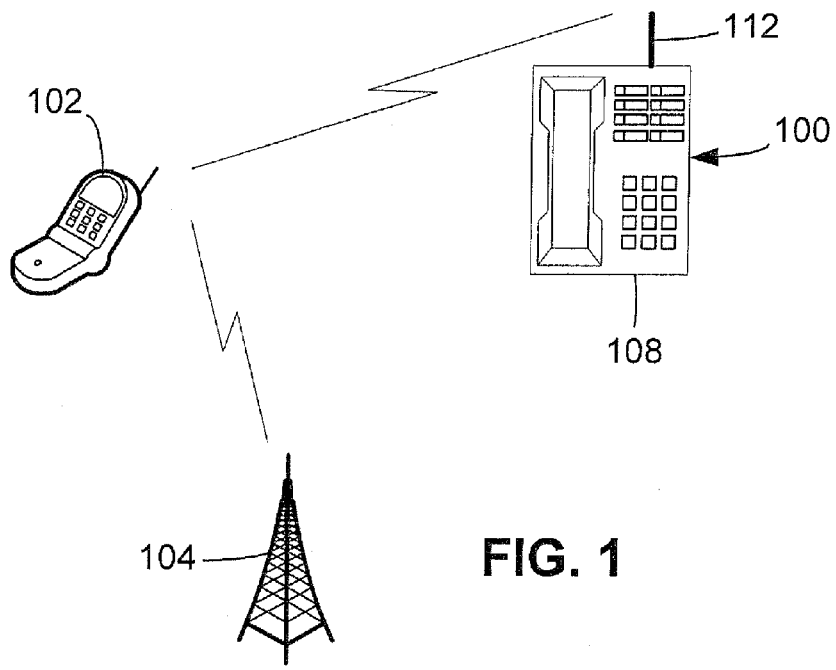
FIG. 1 illustrates an exemplary embodiment of a system in which signals emitted by a wireless mobile telephone are detected by a telephone instrument device.

In the following description, like reference numerals indicate like components to enhance the understanding of the invention through the description of the drawings. Also, although specific features, configurations, arrangements and steps are discussed below, it should be understood that such specificity is for illustrative purposes only. A person skilled in the relevant art will recognize that other features, configurations, arrangements and steps are useful without departing from the spirit and scope of the invention.

As illustrated in FIG. 1, in an exemplary embodiment of the invention a telephone instrument device 100 not only performs functions characteristic of a conventional landline (i.e., public switched telephone network) telephone instrument of the type commonly used in business offices, such as allowing a user to make and receive telephone calls, but also receives radio frequency (RF) signals transmitted by a wireless mobile telephone 102 (also referred to as a cellular telephone or cell phone 102) for reception by a base station 104 (conceptually represented in FIG. 1 by a radio tower symbol) of a wireless (cellular) telecommunication network. In receiving or detecting these RF signals not necessarily intended for it, device 100 is performing what is sometimes colloquially referred to in the art as "sniffing." Although device 100 is described with regard to this exemplary embodiment of the invention as sniffing or detecting RF signals emitted by cell phone 102, it can detect such signals emitted by any other type of user equipment (UE) usable in a similar manner in the telecommunication network, such as a wireless personal digital assistant (PDA), computer, or hybrid device. As described below, the system allows cell phone 102 or other UE to be located with greater than cell precision.

Figure 2:
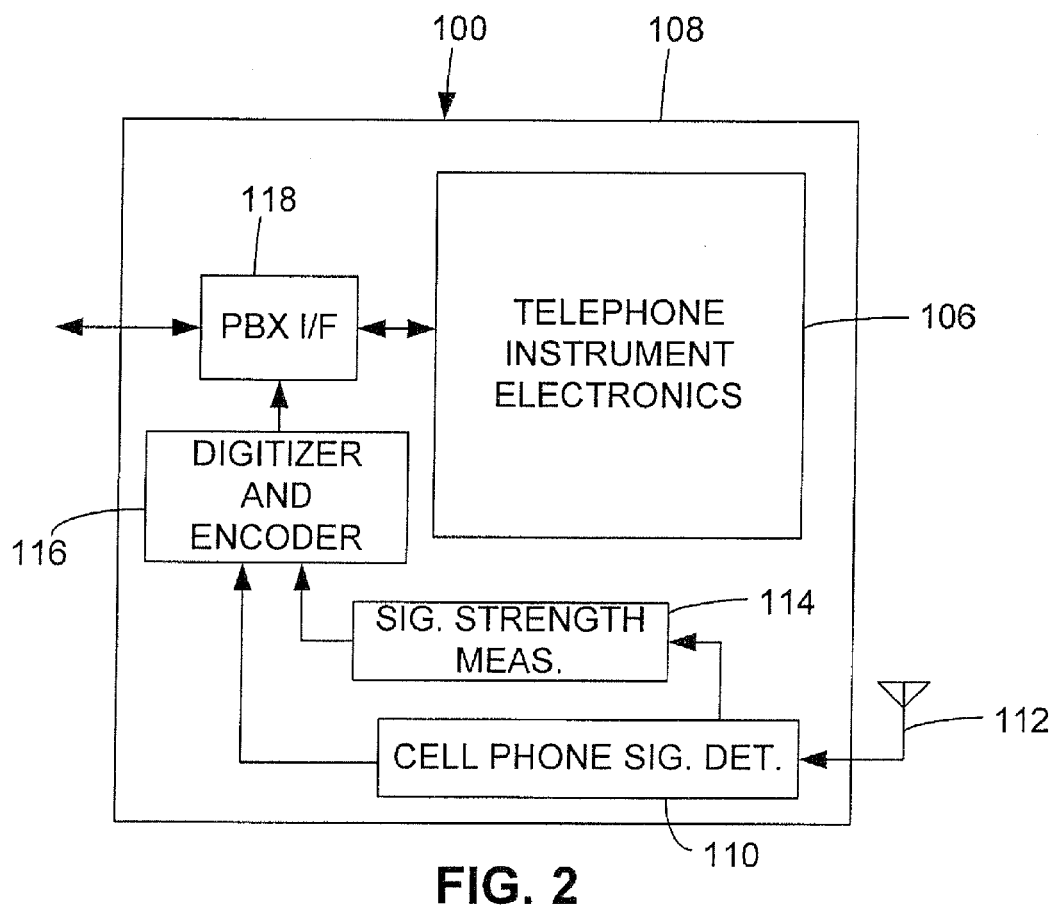
FIG. 2 is a block diagram of a telephone instrument device of the embodiment illustrated in FIG. 1.

As illustrated in FIG. 2, device 100 includes telephone instrument electronics 106, a housing 108, and associated pushbuttons, handset and other user controls (not shown in FIG. 2 for purposes of clarity) generally of the types conventionally found in a landline telephone instrument of the type commonly used in an office environment. Like such a conventional landline telephone instrument, device 100 can be connected to a private branch exchange (PBX) system, e.g., by plugging it into a wall jack with a suitable cable (not shown) in the office or other room in which device 100 is located.

To perform the sniffing or detection function, device 100 further includes a cell phone signal detector 110, coupled to a suitable antenna 112. Device 100 also includes a signal strength measuring circuit 114 that measures the strength of detected RF signals (referred to as cell phone signals for purposes of convenience). A digitizer and encoder 116 digitizes, encodes or otherwise processes the detected cell phone signals so that they can be provided to a PBX interface (I/F) 118 in a format suitable for communication via a PBX system. PBX interface 118 places these signals onto the PBX lines in the building in a manner that does not interfere with signals to or from telephone instrument electronics 106 or conventional functions of the PBX system. The sniffing function is thus transparent from the perspective of a user, who can use device 100 in the manner of a conventional telephone to make and receive calls via the public switched telephone network (PSTN) without regard to the novel capability of device 100 to also detect RF signals emitted by nearby cell phones or other UE. Although antenna 112 is shown for purposes of illustration as being external to device 100, it is preferably mounted inside housing 108 in an unobtrusive manner so that device 100 appears to the casual user to be an ordinary, conventional, telephone instrument.

Signal detector 110 detects only cell phone signals exceeding a predetermined threshold strength that indicates that the cell phone 102 emitting them is in close proximity, such as within a distance on the order of, for example, ten meters. Although not shown for purposes of clarity, above-described elements 110, 114, 116 and 118 can be controlled together by a suitably programmed microprocessor or by other logic. The microprocessor can be the same as that which controls telephone instrument electronics 106 or can be a separate device. Whenever signal detector 110 detects an RF signal of the type emitted from a cellular phone that exceeds the predetermined strength threshold, some or all of the signal information is extracted, digitized, encoded and transmitted via the PBX system. Persons skilled in the art to which the invention relates will readily be capable of programming or configuring device 100 to perform these functions in view of the teachings herein (i.e., in this patent specification).

As noted below, although in the illustrated embodiment of the invention device 100 receives all such cell phone signals and transmits the information detected in them via the PBX, in other embodiments a similar telephone instrument device (not shown) can include logic that causes it to transmit only information in the signals of a selected cell phone, such as only information transmitted by a target cell phone whose International Mobile Subscriber Identity (IMSI) matches that which has been provided to the device so that the device can monitor for only that cell phone and ignore signals transmitted by other cell phones. Alternatively, such a device may transmit only a portion of the cell phone information, such as only the IMSI (and not, for example, dialed digits or voice communications) or only information derived from the cell phone information, such as a flag or other indication that the device has detected the target cell phone IMSI.

Figure 3:
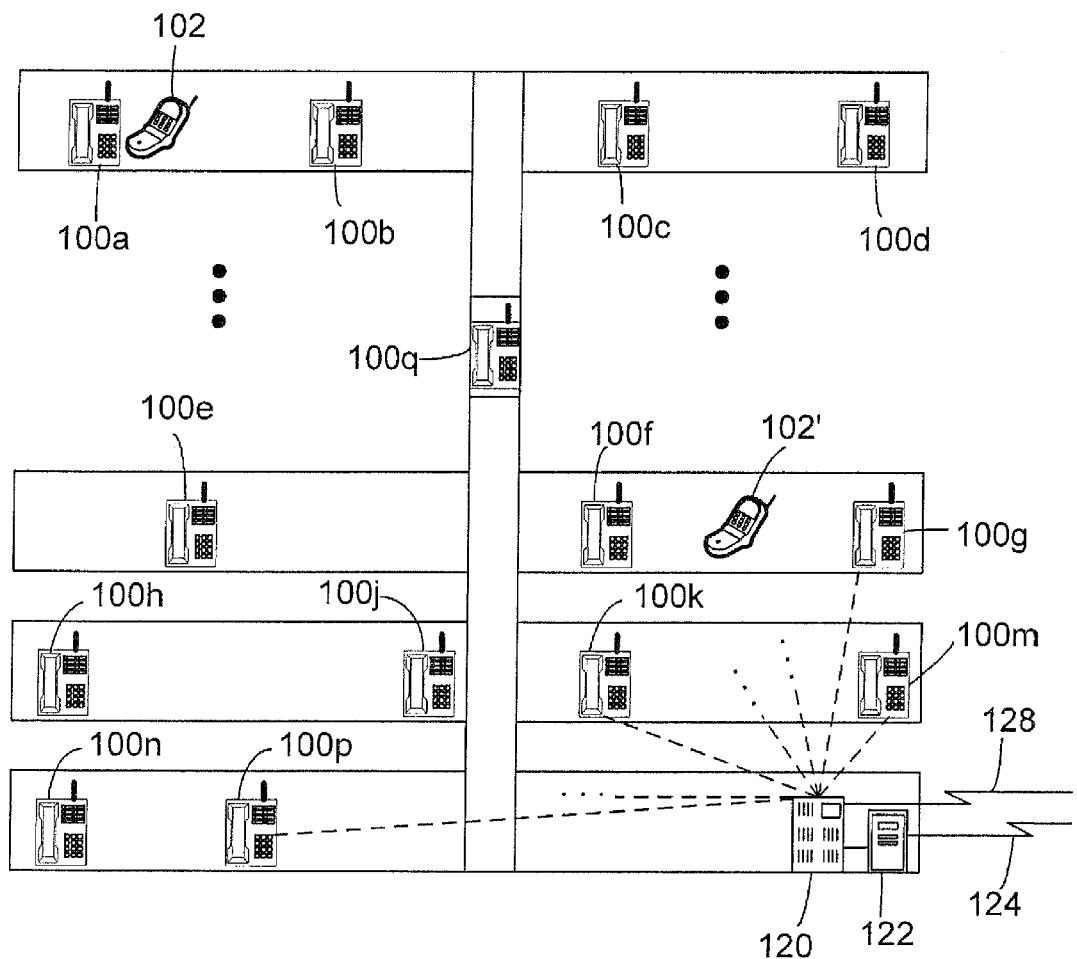
FIG. 3 illustrates a portion of an office building in which a plurality of the telephone instrument devices of FIGS. 1-2 are located in accordance with an exemplary embodiment of the invention.

As illustrated in FIG. 3, a plurality of telephone devices 100 (individually identified as 100a, 100b, 100c, 100d, 100e, 100f, 100g, 100h, 100j, 100k, 100m, 100n, 100p and 100q in FIG. 3) can be installed in a multi-storey building, e.g., in offices, elevators (100q), etc., in place of conventional telephone instruments. Each device 100 communicates (indicated by dashed line) with PBX equipment 120, which may be located in the conventional manner in an electrical equipment locker in a basement or similar area of the building. PBX equipment 120 receives cell phone information from devices 100 as described above. A network server computer 122 in communication with PBX equipment 120 in turn receives the information from PBX equipment 120. PBX equipment 120 is similar to conventional PBX equipment but modified if necessary to ensure that server computer 122 can receive the cell phone information. Server computer 122, PBX equipment 120, or both, can include suitable buffer memories and related logic (not shown) to temporarily store the cell phone information. Server computer 122 then transmits the cell phone information via a dedicated data network 124, such as the Internet or a sub-network thereof (e.g., an Internet Service Provider network), as described below. In other embodiments of the invention, the cell phone information can be transmitted via a telephone line. The telephone line can be the same telephone line 128 via which PBX equipment 120 communicates with the PSTN. Embodiments in which the cell phone information is carried on the same telephone line as ordinary telephone (voice) service can be useful in instances in which the telephone instrument devices are located in a residence, as they can employ Digital Subscriber Line (DSL) technology. Similarly, embodiments in which both the cell phone information and voice are carried on the same network can use Voice over Internet Protocol (VoIP) technology.

A cell phone 102 that is carried by a person in the building will emit information-carrying RF signals that one or more of devices 100 in the building will detect. As described above, each device 100 detects only RF signals exceeding a predetermined threshold strength that indicates the cell phone 102 emitting them is in close proximity. Thus, for example, signals emitted by cell phone 102 are detected only by nearby device 100a. The signals are not detected by devices 100b, 100c, 100d, 100e, etc., because they are too far away. Similarly, signals emitted by another cell phone 102', on a different floor of the building from cell phone 102, may be detected by both devices 100f and 100g but not by other devices 100 that are farther away. It is contemplated that many other buildings and other places within a geographic area have devices 100 installed in them in a similar manner in place of conventional landline telephone instruments.

Although in the above-described embodiment of the invention the telephone instrument device 100 is of the PBX type, in other embodiments it can be of any other suitable type, such as the Centrex type, VoIP, or a type similar to the ordinary single-line telephone instrument commonly used in residences. In embodiments in which the telephone instrument device of the residential type or a similar stand-alone type, the equipment in the PSTN Central Office can perform some or all of the functions that in the above-described embodiment are performed in device 100, PBX equipment 120 and network server 122. Also, although in the illustrated embodiment the telephone instrument electronics 106 and associated cell phone signal detector 110 are integrated together within the same housing 108 (see FIG. 2), in other embodiments they can be housed separately or otherwise less fully integrated but nonetheless located at the same site, e.g., in the same office. In still other embodiments, the signal detectors and their associated telephone instrument electronics can be located not only in buildings but in any other suitable structure or other place in which a landline telephone instrument might ordinarily be installed.

Note that, as all of the illustrated devices 100 are installed in a building, they would typically be within the coverage area of a single cell site (base station) or, at most, an overlapping area of coverage of two or three cell sites. Thus, in a conventional or prior system, if triangulation methods fail or are imprecise due to, for example, reflections of signals within the building, it may be difficult to determine the location of a cell phone 102 in the building with a precision greater than determining that it is within one of those cells. The present invention allows the location of a UE such as cell phone 102 to be determined with greater than cell precision in a geographic area by determining to which of the telephone instrument devices 100 in a geographic area the UE is nearest. The invention can also determine the floor of the building on which cell phone 102 or other UE is located, because it is known (e.g., pre-stored in a database, as described below) on which floor of the building each telephone instrument device 100 is located.

Figure 4:
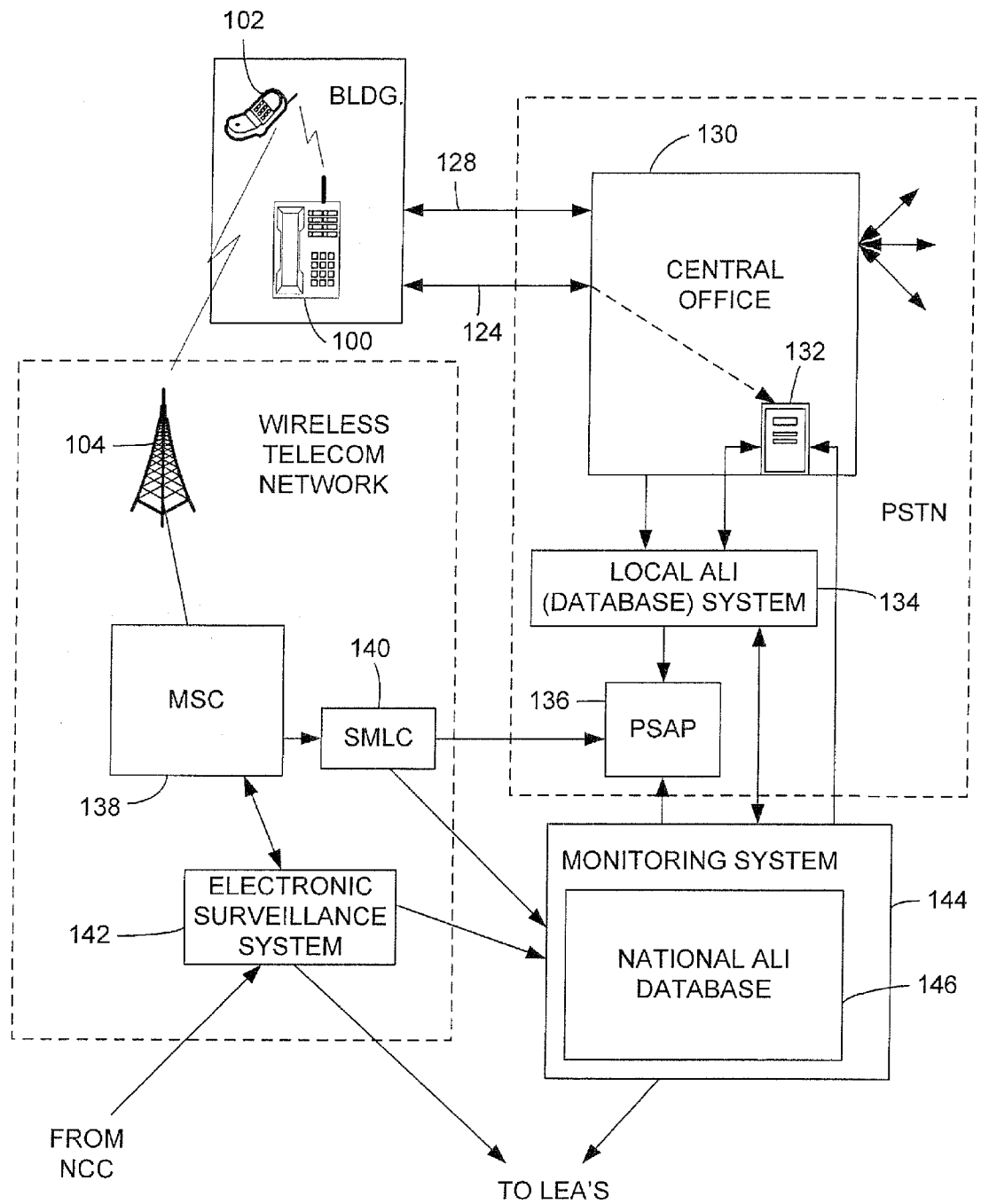
FIG. 4 illustrates an exemplary embodiment of a system for detecting the location of the telephone instrument devices of FIGS. 1-3.

An exemplary system for locating a cell phone 102 using devices 100 is illustrated in FIG. 4. In this system, the PSTN Central Office (CO) 130 or similar switching facility receives the cell phone information via data network 124 and normal (landline) telephone signals via telephone line 128. (As noted above, in other embodiments of the invention the cell phone information and landline telephone signals can be transmitted using other technologies and can share the same line or other transmission medium.) In addition to performing conventional functions relating to switching and otherwise handling telephone calls (e.g., through telephone line 128), CO 130 includes a computer system 132 that receives and stores the cell phone information received via data network 124.

The CO 130 can communicate with a conventional local ALI system 134, which essentially comprises a database and associated control devices. As known in the art, an ALI system is an element or arm the PSTN that provides the location of a caller's (landline) telephone and is most typically used in conjunction with the E911 system. The ALI system 134 also communicates directly with computer system 132, receiving the telephone number of the device 100 that detected the cell phone information. The ALI system 134 also receives some or all of the cell phone information, including the telephone number of the cell phone 102 from which signals were detected. The ALI system 134 in turn is in communication with one or more Public Service Answering Points (PSAPs) 136, which are call centers at which operators answer emergency calls in accordance with the E911 system.

Cell phone 102 can also communicate in the conventional manner with a wireless (cellular) telecommunications network. The Mobile Switching Center (MSC) 138 and one base station 104 of such a network are shown in FIG. 4 for purposes of illustration, but persons skilled in the art to which the invention relates can appreciate that such a network typically includes many more elements, such as other base stations, base station controllers, home location registers, visitor location registers, and so forth, which are not shown in FIG. 4 for purposes of clarity.

A Serving Mobile Location Center (SMLC) 140 is also shown as part of the wireless telecommunications network because it performs a relevant conventional function of attempting to determine the location of cell phone 102. SMLC 140 can use any suitable means known in the art for determining the location of cell phone 102 or other UE, such as Assisted GPS (A-GPS), Time Difference of Arrival (TDOA), Angle of Arrival (AOA), etc. The present invention can be used to augment the conventional location detection function of SMLC 140 or similar equipment.

The wireless telecommunications network also includes an electronic surveillance system 142, which is conventionally used to monitor telephone calls in compliance with court-ordered wiretap authorizations or similar surveillance authorizations. Such authorizations may be received by electronic surveillance system 142 from a national compliance center (NCC) (not shown) operated by the telecommunications network service provider or a consortium of such providers. As known in the art, a surveillance authorization typically arises out of request by a law enforcement agency (LEA) (not shown) for a court order or for surveillance under so-called "exigent circumstances." The authorization typically specifies the IMSI or phone number of the target UE (e.g., cell phone 102) to be surveilled, the MSC's covering the area to be surveilled (because the target is believed to be located in an area serviced by those MSC's), and the time(s) of day to search, number of days to search for transmissions from the target UE, and other such information. In accordance with the present invention, an LEA can specify additional information, including, for example, whether to use the Landline-Assisted-Location (LAL) of the present invention. The term "Landline-Assisted-Location" is used herein to refer to the novel system described above, in which devices 100 are used to assist in locating the UE. Electronic surveillance system 142 conventionally includes a graphical user interface (not shown) to aid personnel in entering such information.

The PSAP 136 and local ALI system 134 can communicate with a monitoring system 144. Monitoring system 144 can be centrally or otherwise conveniently located with regard to the various elements of the PSTN and wireless telecommunication networks with which it communicates. For example, a national monitoring system center can be provided that provides UE locating services to wireless telecommunication networks nationwide. Monitoring system 144 includes a national ALI database 146, which is similar to local ALI database 134 but includes information gathered from not only local ALI database 134 but also other local ALI databases nationwide (not shown).

Although the wireless telecommunications network described above is of the GSM type for purposes of illustration, persons skilled in the art to which the present invention relates will readily understand how to embody the present invention in any other type of cellular communication network in view of this example and other teachings herein.

The operation of the system is described below with regard to the flow diagrams of FIGS. 5 and 6. The flow diagram of FIG. 5 relates to handling an E911 call, while the flow diagram of FIG. 6 relates to handling a surveillance authorization.

Figure 5:
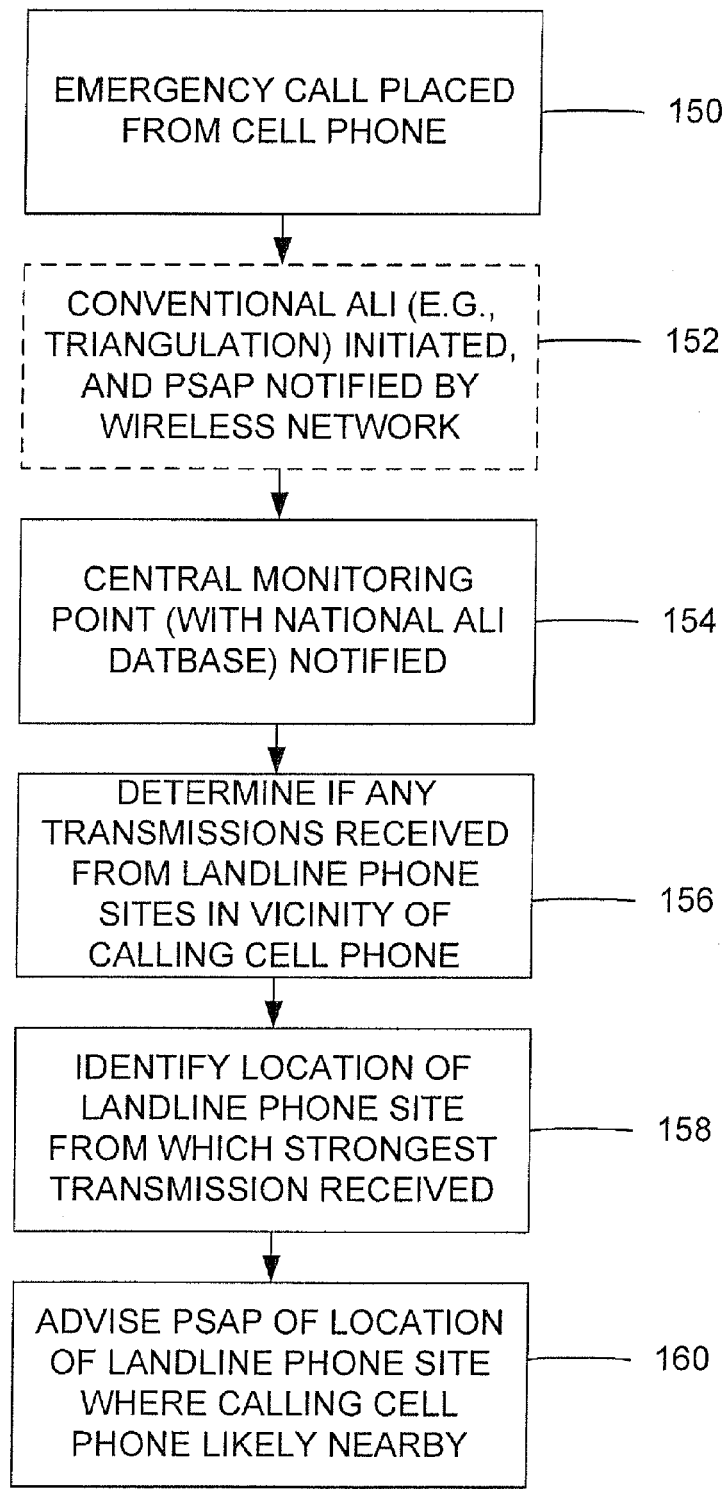
FIG. 5 is a flow diagram illustrating a method for using the system of FIG. 4 to detect the location of a wireless mobile telephone in response to an emergency call placed from it near one or more of the telephone instrument devices.
Figure 6:
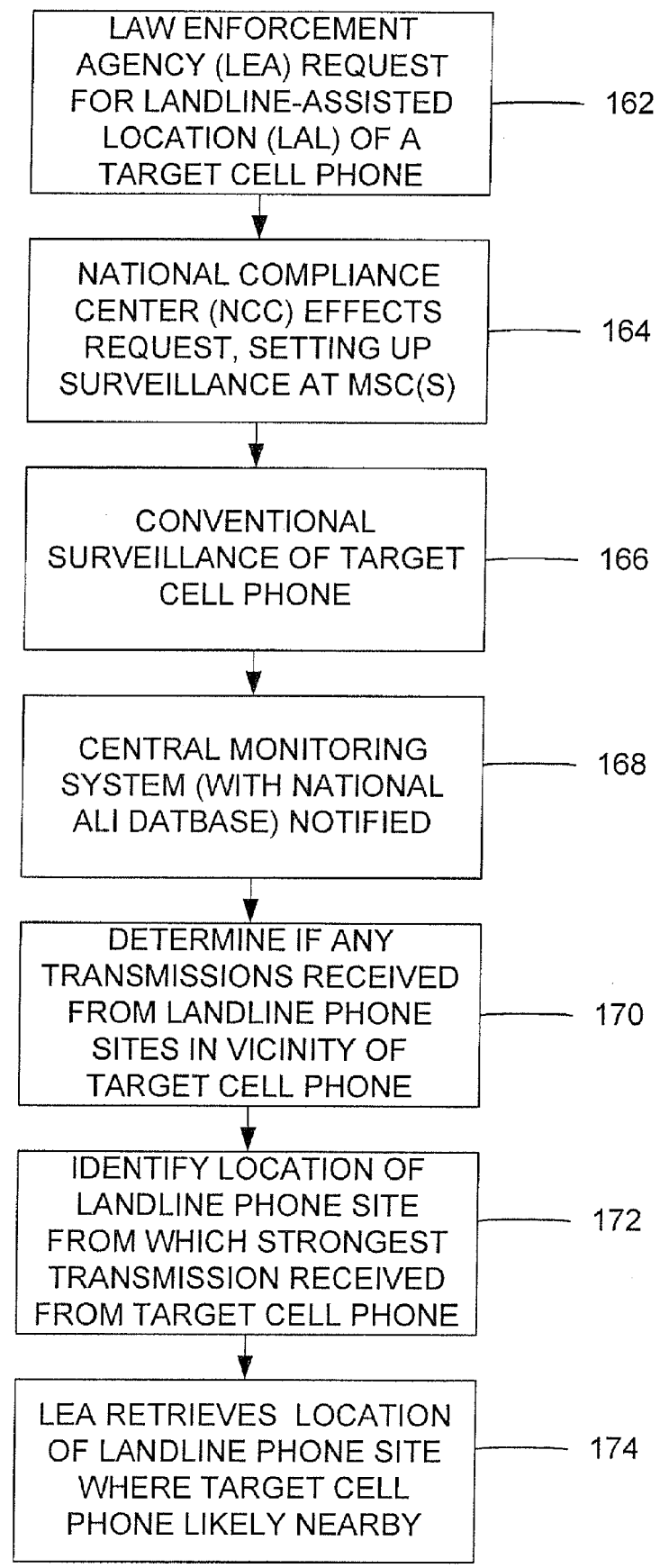
FIG. 6 is a flow diagram illustrating a method for using the system of FIG. 4 to detect the location of a target wireless mobile telephone for which surveillance has been authorized.

With reference to FIGS. 4 and 5, at step 150, a user of cell phone 102 places an emergency call, e.g., by dialing "911." At step 152, which is shown in dashed line to indicate that it is a conventional step for which the novel methods of the present invention can substitute or augment, MSC 138, in handling the call, causes SMLC 140 to initiate conventional triangulation or other ALI methods and notify PSAP 136 of the location of cell phone 102 if it can be determined. As noted above, it may be difficult to determine the location of cell phone 102 using such methods because cell phone 102 in this example is inside the building.

At step 154, SMLC 140 or other suitable element of the wireless telecommunications network notifies monitoring system 144 that cell phone 102 has placed an emergency call and provides the IMSI, phone number, or other information that uniquely identifies cell phone 102. Monitoring system 144 in turn provides the IMSI or other uniquely identifying information to local ALI system 134 so that local ALI system 134 can monitor for transmissions that originate with cell phone 102. As described above, local ALI system 134 can determine that a transmission originated with cell phone 102 because the transmission will comprise identifying information, such as the IMSI, detected in the RE radio signals emitted by cell phone 102 when it is in close proximity to one or more of devices 100.

At step 156, local ALI system 134 determines if any transmissions have been received from a device 100 in the vicinity of cell phone 102. To perform this step, local ALI system receives from CO 130 (via computer system 132) the phone number that identifies the landline telephone site at which a device 100 has detected RF signals emitted by cell phone 102. For example, computer system 132 in CO 130 may receive a phone number from server computer 122 (FIG. 3) identifying device 100a as having detected RF signals emitted by cell phone 102. Computer system 132 in turn transmits the phone number and any other information extracted from those RF signals to local ALI system 134.

At step 158, if local ALI system 134 determines that an IMSI or other information it has received from CO 130 identifies cell phone 102 or other UE for which local ALI system 134 has been alerted to monitor, local ALI system 134 notifies monitoring system 144 that it has detected a transmission from cell phone 102 or other such UE. As local ALI system 134 includes a database relating the phone number of device 100a or other such device 100 to the site at which it is located, at step 160 local ALI system 134 can notify the appropriate PSAP 136 (which is typically the PSAP nearest the building in which cell phone 102 is located, to minimize the delay in arrival of any emergency personnel that the PSAP operator may dispatch to the building). Local ALI system 134 can provide PSAP 136 with not only the street address of the building but also the floor and even the office or offices in which cell phone 102 is most likely located. ALI system 134 can determine the floor and office even if more than one device 100 received signals from cell phone 102 by determining which device or devices 100 received the strongest signals. As indicated above with regard to FIGS. 2-3, the signal strength of all detected signals is measured, and a signal strength measurement can be provided to server 122 along with the information extracted from or detected in the RF signals.

The present invention can also be used to locate a UE under surveillance. With reference to FIGS. 4 and 6, at step 162 a law enforcement agency (LEA) transmits a court-ordered target UE (e.g., cell phone 102) surveillance authorization, a surveillance authorization pursuant to so-called "exigent circumstances" rules, or other suitable surveillance authorization, to a national compliance center (NCC) that has been established by wireless telecommunications network operators to comply with such authorizations for surveillance of cell phone communications. It is contemplated that the LAL method of the present invention will be provided as an option that the LEA can select and which can be specified in the authorization to supplement conventional surveillance and location methods. For example, personnel can check a new "LAL" box in the graphical user interface (not shown) through which information is entered into surveillance system 142. Personnel can also enter the geographic area in which the devices 100 to be monitored are located by, for example, entering postal (e.g., ZIP) codes, city names, codes identifying CO's, or other suitable information.

At step 164, NCC personnel effect the authorization by causing MSC 138 (and any other such MSC's (not shown) that may cover the geographic area specified in the surveillance authorization) to begin monitoring for any communications that may occur in the wireless network involving the target cell phone 102. Electronic surveillance system 142 controls this surveillance or monitoring in the conventional manner at step 166. As such surveillance is conventional and well-understood by persons skilled in the art, it is not described in further detail herein. The surveillance typically involves gathering voice communications, dialed digits, or other information that is transmitted to or from the target UE, and providing the gathered information to the authorized LEA.

At step 168, if LAL is requested, electronic surveillance system 142 also notifies monitoring system 144 (which in turn notifies local ALI system 134) to monitor for occurrence of transmissions originating at any of the landline telephone sites having devices 100 or a subset thereof specified in the surveillance authorization. As noted above, devices 100 are located throughout some or all of the geographic area covered by MSC 138 of the wireless telecommunications network. Electronic surveillance system 142 also provides monitoring system 144 (which in turn provides local ALI system 134) with the IMSI, phone number, or other information that uniquely identifies the target cell phone 102. As described above, local ALI system 134 can determine that a transmission originated with cell phone 102 because the transmission will comprise identifying information, such as the IMSI, detected in the RF radio signals emitted by cell phone 102 when it is in close proximity to one or more of devices 100.

At step 170, local ALI system 134 determines if any transmissions have been received from a device 100 in the vicinity of cell phone 102. To perform this step, local ALI system receives from CO 130 (via computer system 132) the phone number that identifies the landline telephone site at which a device 100 has detected RF signals emitted by cell phone 102. For example, computer system 132 in CO 130 may receive a phone number from server computer 122 (FIG. 3) identifying device 100a as having detected RF signals emitted by cell phone 102. Computer system 132 in turn transmits the phone number and any other information extracted from those RF signals to local ALI system 134.

At step 172, if local ALI system 134 determines that an IMSI or other information it has received from CO 130 identifies cell phone 102 or other UE for which local ALI system 134 has been alerted to monitor, local ALI system 134 notifies monitoring system 144 that it has detected a transmission from phone 102 or other target UE. As local ALI system 134 includes a database relating the phone number of device 100a or other such device 100 to the site at which it is located, at step 174 it can notify monitoring system 144, which in turn can notify the LEA that obtained the surveillance authorization. Local ALI system 134 can provide monitoring system 144 with not only the street address of the building but also the floor and even the office or offices in which cell phone 102 is most likely located. ALI system 134 can determine the floor and office even if more than one device 100 received signals from cell phone 102 by determining which device or devices 100 received the strongest signals. As indicated above with regard to FIGS. 2-3, the signal strength of all detected signals is measured, and a signal strength measurement is provided to server 122 along with the information extracted from or detected in the RF signals.

At step 174, the requesting LEA can retrieve information from monitoring system 144 that identifies the location of the device 100 that received the (strongest) signals emitted by the target cell phone 102.

Although in the illustrated embodiments of the invention, any detected cell phone information, regardless of whether from cell phone 102, is streamed to local ALI system 134, which then determines whether it has received an IMSI or information identifying the origin of the signals as cell phone 102 and passes on only information originating with cell phone 102, in other embodiments such a determination can be made by any other suitable element of the system, such as monitoring system 144, CO 130, or elements within the building (see FIG. 3) or similar place, such as network server 122 or PBX equipment 120. Thus, in such other embodiments, information identifying cell phone 102 or other target UE is provided to such other element so that the element can monitor for any incoming transmissions from the target UE. In such embodiments, the information is forwarded only if a transmission from the target UE is detected. The central location at which the forwarded transmissions are received can include not only monitoring system 144 but any other central location, i.e., a location not associated solely with a single landline telephone site at which a device 100 is located but rather covering a number of such landline telephone sites. In still other embodiments of the invention, each device 100 can be provided with the target UE IMSI or other information identifying the target so that it can identify the source of the signals and forward only information originating at the target UE.

Similarly, although in the illustrated embodiment it is local ALI system 134 that identifies the device 100 that detected the strongest RF signals, in other embodiments it can be any other suitable element of the system that performs this function. Thus, for example, in another embodiment, computer system 132 in CO 130 can receive information from multiple devices 100 that include the same IMSI or otherwise identify the same cell phone or other UE and forward only the information relating to a target or monitored-for UE.

It will be apparent to those skilled in the art that various modifications and variations can be made to this invention without departing from the spirit or scope of the invention. Thus, it is intended that the present invention covers the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A method for locating a wireless communication device in a wireless telecommunications network using a dual-function landline telephone device including a handset, telephone instrument electronics for communicating with a public switched telephone network (PSTN), a wireless communication device signal detector, and a signal strength measuring circuit, the method comprising:

receiving a communication from a source other than the wireless communication device identifying the wireless communication device as a target wireless communication device;

the wireless communication device signal detector of the dual-function landline telephone device receiving radio-frequency (RF) signals emitted from the wireless communication device;

determining from data in the RF signals that the RF signals were emitted by the wireless communication device identified as the target wireless communication device in the communication;

the dual-function landline telephone device performing dual functions of enabling a user to communicate with the PSTN via the handset and analyzing the RF signals received from the wireless communication device, including the signal strength measuring circuit measuring strength of the RF signals received by the wireless communication device signal detector of the dual-function landline telephone device; and determining a location of the wireless communication device including considering a location of the dual-function landline telephone device performing the dual functions of enabling a user to communicate with the PSTN via the handset and analyzing the RF signals from the wireless communication device;

wherein the signal strength measuring circuit measures the strength of the RF signals received by the wireless communication device signal detector of the dual-function landline telephone device only if the wireless communication device from which the RF signals emitted is the target wireless communication device identified in the communication.

2. The method of claim 1, wherein:
the dual-function landline telephone device is coupled to a private branch exchange (PBX) system; and
the dual-function landline telephone device enables the user to communicate with the PSTN via the PBX.

3. The method of claim 1, wherein determining the location of the wireless communication device includes determining that the dual-function landline telephone device receiving the RF signals emitted by the wireless communication device are stronger than RF signals emitted by the wireless communication device that are detected at another dual-function landline telephone device.

4. The method of claim 1,
wherein the communication identifying the wireless communication device as a target wireless communication device is associated with a wiretap order from a law enforcement agency authorizing monitoring of the wireless communication device.

5. The method of claim 1, wherein determining the location of the wireless communication device comprises detecting in the RF signals unique wireless communication device identity information transmitted by the wireless communication device.

6. The method of claim 5, wherein the unique wireless communication device identity information comprises an International Mobile Subscriber Identity (IMSI).

7. The method of claim 1, wherein determining the location of the wireless communication device comprises monitoring a data network that provides data communication between equipment at a central location and the dual-function landline telephone device.

8. The method of claim 7, wherein at least a portion of the data network comprises the Internet.

9. The method of claim 1, further including:
identifying the wireless communication device as a target wireless communication device; and
determining from the RF signals whether the wireless communication device that emitted the RF signals received is the identified target wireless communication device;
wherein the signal strength measuring circuit measures the strength of the RF signals received by the wireless communication device signal detector of the dual-function landline telephone device only if the wireless communication device from which the RF signals emitted is the identified target wireless communication device.

10. A dual-function landline telephone device for locating a wireless communication device in a wireless telecommunications network, the dual-function landline telephone comprising:
a handset;
landline telephone instrument electronics for receiving and initiating landline telephone calls to and from a user of the handset to communicate via a public switched telephone network (PSTN);
a wireless communication device signal detector co-located with the landline telephone instrument electronics for detecting radio signals emitted by a wireless communication device; and communication electronics including a signal strength measuring circuit for measuring strength of RF signals received by the wireless communication device signal detector, a detection circuit for detecting information in the RF signals, and a transmission circuit for transmitting the detected information from the dual-function landline telephone device to a remote device;

wherein the signal strength measuring circuit measures the strength of the RF signals received by the wireless communication device signal detector of the dual-function landline telephone device only if the wireless communication device from which the RF signals emitted is a target wireless communication device identified in a communication from a source other than the wireless communication device as the target wireless communication device.

11. The dual-function landline telephone device of claim 10, wherein the communication electronics further transmits telephone identification information associated with the dual-function landline telephone device to the remote device.

12. The dual-function landline telephone device of claim 10, wherein the wireless communication device signal detector detects unique wireless communication device identity information transmitted by the wireless communication device.

13. The dual-function landline telephone device of claim 12, wherein the unique wireless communication device identity information comprises an International Mobile subscriber Identity (IMSI).

14. The dual-function landline telephone device of claim 10, wherein the communication electronics includes a private branch exchange (PBX) interface through which the detected information is transmitted to PBX equipment.

15. The dual-function landline telephone device of claim 10, wherein the device:
identifies the wireless communication device as a target wireless communication device;
determines from the RF signals whether the wireless communication device that emitted the RF signals received by the dual-function landline telephone device is the identified target wireless communication device; and
measures the strength of the RF signals received by the wireless communication device signal detector of the dual-function landline telephone device only if the wireless communication device from which the RF signals emitted is the identified target wireless communication device.

16. The dual-function landline telephone device of claim 15, wherein the device identifies the wireless communication device as the target wireless communication device in response to a trigger selected from a group of triggers consisting of:
receiving a wiretap order from a law enforcement agency authorizing monitoring of the wireless communication device; and
receiving an emergency call from the wireless communication device.

17. A system for locating a wireless communication device in a wireless telecommunications network using a plurality of dual-function landline telephone devices, the system comprising:
a monitoring system configured to monitor transmissions originating at the plurality of dual-function landline telephone devices being within a cell of the wireless telecommunications network, wherein:
each dual-function landline telephone device performs dual functions of enabling a user to communicate with a public switched telephone network (PSTN), via a handset of the dual-function landline telephone device, and analyzing radio-frequency (RF) signals emitted from the wireless communication device; and each transmission originating at the plurality of dual-function landline telephone devices comprises:
  information detected in the RF signals emitted by a wireless communication device in close proximity to a particular dual-function landline telephone device of the plurality of dual-function landline telephone devices, and
  information identifying the at least one dual-function landline telephone device at which the RF signals emitted by the wireless communication device have been detected by the particular dual-function landline telephone device; and wherein the monitoring system is configured to, based on the transmissions originating at the plurality of dual-function landline telephone devices, determine a location of the wireless communication device in three dimensions.

18. The system of claim 17, wherein:
each dual-function landline telephone device identifies the wireless communication device as a target wireless communication device;
each dual-function landline telephone device determines from the RF signals whether the wireless communication device that emitted the RF signals received by the dual-function landline telephone device is the identified target wireless communication device; and
each dual-function landline telephone device measures a strength of the RF signals received by the wireless communication device signal detector of the dual-function landline telephone device only if the wireless communication device from which the RF signals emitted is the identified target wireless communication device.

19. The system of claim 18, wherein each dual-function landline telephone device identifies the wireless communication device as the target wireless communication device in response to a trigger selected from a group of triggers consisting of:
receiving a wiretap order from a law enforcement agency authorizing monitoring of the wireless communication device; and
receiving an emergency call from the wireless communication device.

20. The system of claim 17, wherein the monitoring system, in being configured to determine a location of the wireless communication device in three dimensions based on the transmissions originating at the plurality of dual-function landline telephone devices, is configured to determine a location of the wireless communication device including an altitude of the wireless communication device.

* * * * *